(12) United States Patent
Kawamura et al.

(10) Patent No.: US 6,334,085 B1
(45) Date of Patent: Dec. 25, 2001

(54) DATA PROCESSING UNIT FOR CONSTRUCTION MACHINE (75) Inventors: Koichi Kawamura; Seiya Haga, both of Hirakata (JP)

(73) Assignee: Komatsu LTD, Tokyo (JP)

(*) Notice: Subject to any disclaimer, the term of this patent is extended or adjusted under 35 U.S.C. 154(b) by 0 days.

(21) Appl. No.: 09/557,415

(22) Filed: Apr. 21, 2000

(30) Foreign Application Priority Data

Apr. 26, 1999 (JP) .................................................. 11-117450

(51) Int. Cl.$^7$ ........................... G01M 15/00; G06F 17/40
(52) U.S. Cl. ............................................... 701/115; 701/30
(58) Field of Search .................................. 701/30, 33, 35, 701/102, 115; 73/117.3; 340/457.4

(56) References Cited

U.S. PATENT DOCUMENTS 5,450,321 * 9/1995 Crane ........................................ 701/35
5,969,601 * 10/1999 Sato et al. ................................ 701/30

FOREIGN PATENT DOCUMENTS 11-211622   8/1999 (JP) .
12-55791    2/2000 (JP) .

* cited by examiner

Primary Examiner—Andrew M. Dolinar
(74) Attorney, Agent, or Firm—Armstrong, Westerman, Hattori, McLeland & Naughton, LLP.

(57) ABSTRACT

A data processing unit for a construction machine, the unit being capable of storing the load condition of an engine independently of variations in engine output torque without entailing increases in cost due to additional installation of sensors. This data processing unit is designed such that the rotational speed of the engine when no load is imposed thereon and the actual rotational speed of the engine are detected; combinations of first parameter values and second parameter values are divided into a plurality of regions thereby setting a load map, the first parameter values being the values of the rotational speed of the engine when no load is imposed thereon while the second parameter values are the values of the difference between the rotational speed of the engine when no load is imposed thereon and the actual speed of the engine; detecting time of the first parameter value and the second parameter value of each region in the load map until a certain time elapses is accumulated; and the result of the accumulation for each region of the load map is stored.

6 Claims, 9 Drawing Sheets

|  | $N_{19}$ | $k_1$ | $k_1$ | $k_2$ | $k_3$ | $k_3$ | $k_4$ | $k_4$ | $k_5$ | $k_5$ |
|---|---|---|---|---|---|---|---|---|---|---|
| $N_0 - N_a$ | $N_{18}$ | $k_1$ | $k_1$ | $k_2$ | $k_3$ | $k_3$ | $k_4$ | $k_4$ | $k_5$ | $k_5$ |
|  | $N_{17}$ | $k_1$ | $k_1$ | $k_2$ | $k_3$ | $k_3$ | $k_4$ | $k_4$ | $k_4$ | $k_4$ |
|  | $N_{16}$ | $k_1$ | $k_1$ | $k_2$ | $k_3$ | $k_3$ | $k_4$ | $k_4$ | $k_4$ | $k_4$ |
|  | $N_{15}$ | $k_1$ | $k_1$ | $k_2$ | $k_3$ | $k_3$ | $k_3$ | $k_4$ | $k_4$ | $k_4$ |
|  | $N_{14}$ | $k_0$ | $k_1$ | $k_2$ | $k_2$ | $k_3$ | $k_3$ | $k_3$ | $k_3$ | $k_3$ |
|  | $N_{13}$ | $k_0$ | $k_1$ | $k_1$ | $k_2$ | $k_3$ | $k_3$ | $k_3$ | $k_3$ | $k_3$ |
|  | $N_{12}$ | $k_0$ | $k_1$ | $k_1$ | $k_2$ | $k_2$ | $k_2$ | $k_2$ | $k_2$ | $k_2$ |
|  | $N_{11}$ | $k_0$ | $k_1$ | $k_1$ | $k_1$ | $k_1$ | $k_1$ | $k_1$ | $k_1$ | $k_1$ |
|  |  | $N_{01}$ | $N_{02}$ | $N_{03}$ | $N_{04}$ | $N_{05}$ | $N_{06}$ | $N_{07}$ | $N_{08}$ | $N_{09}$ |

$\longrightarrow N_0$

DATA PROCESSING UNIT FOR CONSTRUCTION MACHINE

TECHNICAL FIELD

The present invention relates to a data processing unit for a construction machine for collecting and processing data on the load condition of the engine of a construction machine.

BACKGROUND ART

It is very important for construction machines such as hydraulic shovels and bulldozers to accurately estimate a timing of engine overhaul, that is, the operation life of the engine in order to carry out engine maintenance and inspection in accordance with a set schedule. However, there are difficulties in individually estimating the engine life of vehicles, because the engine life of construction machines varies significantly depending on their working situations and operating conditions even if they are of the same type and have the same type engines.

One attempt was previously made in which data on the load condition of an engine are collected over a long period of time and engine life is estimated from changes with time in the load condition. This method is effective where the engine is continuously operated under a constant load, but it has encountered considerable difficulties when applied to cases where engine load changes with time.

The present applicant has proposed one solution to the above problem in a previous invention (entitled "A device for estimating the life of a machine having an engine and heat source", Japanese Patent Publication (KOKAI) Gazette No. 11-211622 (1999)). In this prior invention, the values of operation parameters indicative of the load imposed on an engine are classified into a plurality of levels thereby setting a load map; the time of detecting a parameter value belonging to each level of the load map is accumulated; the actual amount of damage to the engine is calculated based on the accumulated time; and the engine life corresponding to the calculated amount of damage is obtained from preset data indicative of the relationship between the degree of damage and the length of life. As the operation parameters mentioned herein, the rotational speed of an engine, output torque (or the amount of fuel injection) and the like are selected.

In the previous invention, while detection data from an engine rotational speed sensor mounted for controlling basic performance can be utilized in the detection of the rotational speed of the engine, a specialized sensor such as a rack position sensor or pump swash plate sensor needs to be newly adapted for the detection of output torque. This results in increased cost.

Figure 9:
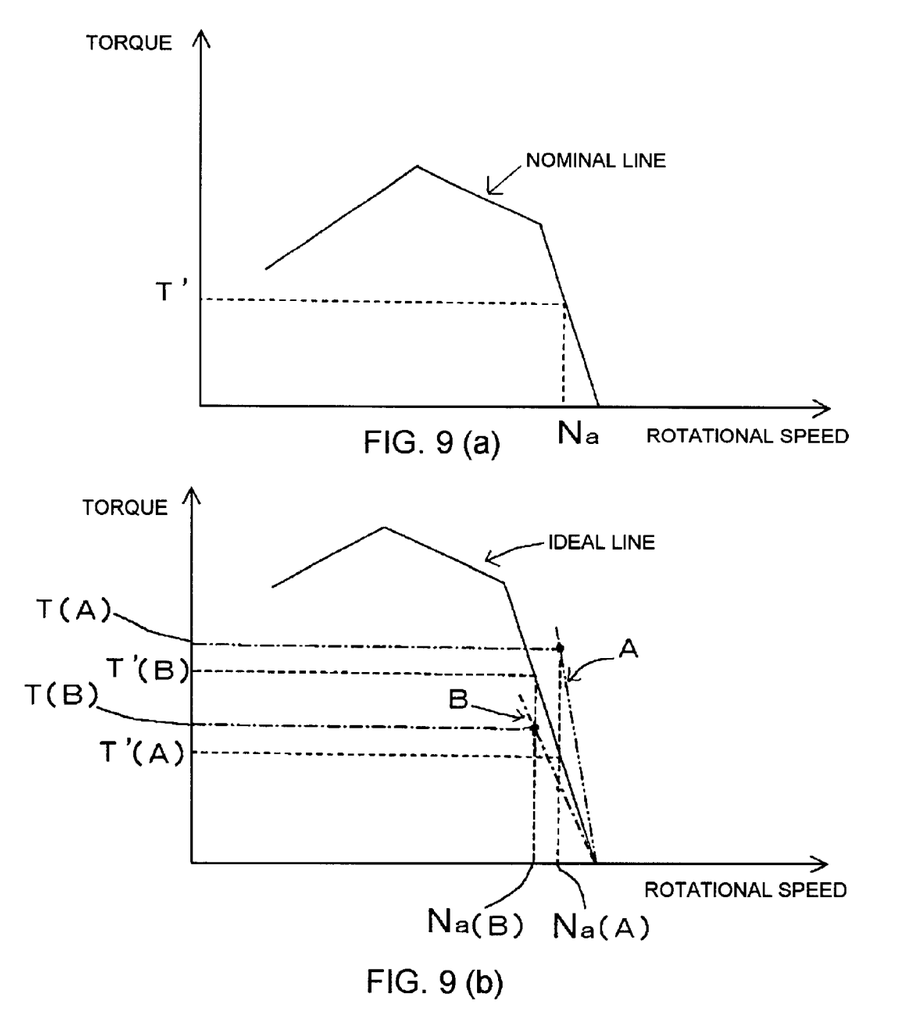
FIGS. 9(a) and 9(b) illustrate a problem in conventional engine load detection.

On the other hand, there is a technique for estimating output torque without addition of a specialized sensor. Concretely, a nominal line in an engine output characteristic graph such as shown in FIG. 9(a) is stored in the controller beforehand, and an output torque T' is estimated from an actual rotational speed Na detected by an engine rotational speed sensor. This estimation technique however has revealed a difficulty in ensuring detection accuracy because there occurs reversal in the relationship between detected load and actual load such as shown in FIG. 9(b). More specifically explaining with reference to FIG. 9(b), when comparing the two engine data represented by chain lines A and B which vary in regulation relative to the ideal line represented by solid line, the relationship between actual torque T(A) and actual torque T(B) relative to engine rotational speeds Na(A) and Na(B) is represented by T(A) >T(B), whereas the relationship between estimated torque T'(A) and estimated torque T'(B) is represented by T'(A)<T'(B). As understood from this, the actual torque relationship is opposite to the estimated torque relationship.

The invention has been directed to overcoming the above problems and a primary object of the invention is therefore to provide a data processing unit for a construction machine, the unit being capable of storing data on load condition independently of variations in engine output torque and performing data processing such as estimation of the operation life of an engine based on the stored data, without additionally incorporating a sensor which entails increased cost.

DISCLOSURE OF THE INVENTION

The above object can be achieved by a data processing unit for a construction machine according to the invention, which collects and processes data on the load condition of an engine of the construction machine, the unit comprising:

(a) detecting means for detecting the rotational speed of the engine when no load is imposed on the engine and the actual rotational speed of the engine;

(b) load map setting means for setting a load map based on the rotational speed when no load is imposed and the actual rotational speed which have been detected by the detecting means, by dividing combinations of first parameter values and second parameter values into a plurality of regions, the first parameter values being the values of the rotational speed when no load is imposed while the second parameter values being the values of the difference between the rotational speed when no load is imposed and the actual rotational speed; and (c) calculating and storing means for accumulating the time of detecting the first parameter value and second parameter value of each region in the load map set by the load map setting means until a certain time elapses and for storing the result of the accumulation for each region in the load map.

According to the invention, the rotational speed of the engine when no load is imposed on the engine and the actual rotational speed of the engine are detected by the detecting means. Based on these detected rotational speeds, combinations of first parameter values and second parameter values are divided into a plurality of regions according to levels in order to set a load map representative of the load condition of the engine. The first parameter values are the values of the rotational speed of the engine when no load is imposed thereon, whereas the second parameter values are the values of the difference between the rotational speed of the engine when no load is imposed thereon and the actual rotational speed of the engine. The detecting time of the first parameter value and the second parameter value of each region in the load map is accumulated until a certain period of time elapses. The result of this accumulation for every region of the load map is stored. In the invention, sensors such as an engine rotational speed sensor and governor position sensor which are conventionally used for basic performance control can be utilized for obtaining the first and second parameters, so that data on the load condition of the engine can be obtained without adaptation of an additional sensor which entails increased cost. Unlike the conventional techniques, the invention does not detect the absolute value of engine load (output horse power), but is designed to store, as a load map, the relationship between the rotational speed when no load is imposed and the difference between the rotational speed when no load is imposed and the actual rotational speed and to allow the load map to be recognized as a pattern. Therefore, the load condition of the engine can be stored without being affected by detection accuracy and the reversal phenomenon in a plurality of data pieces can be prevented.

Figure 1:
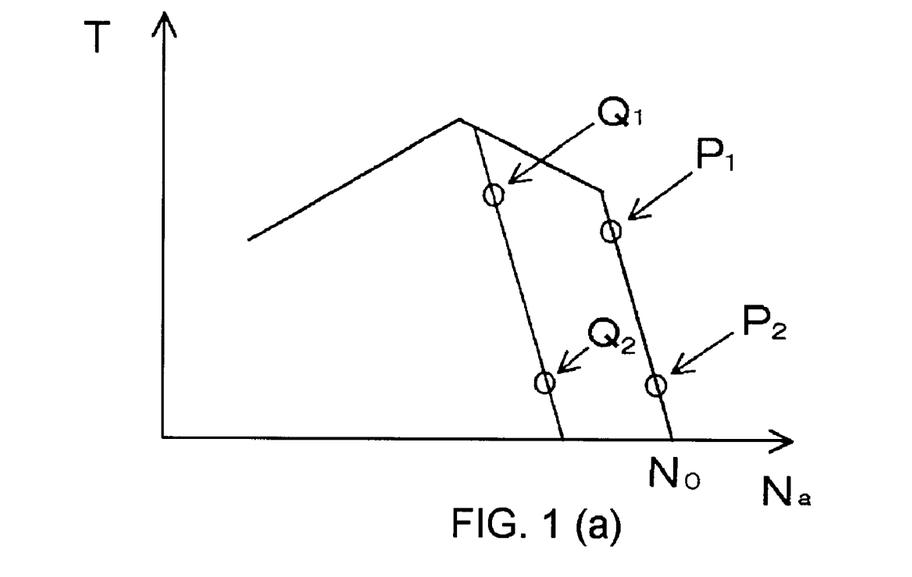
FIG. 1(a) and 1(b) are graphs showing the concept of data processing according to the invention.

According to the concept of the invention, point $P_1$(high throttle and high load), point $P_2$(high throttle and low load), point $Q_1$(low throttle and high load) and point $Q_2$(low throttle and low load) in the graph of engine rotational speed (Na) versus torque (T) such as shown in FIG. 1(a) are phase-shifted to points $P_1'$, $P_2'$, $Q_1'$, and $Q_2'$ in the load map (shown in FIG. 1(b)) showing the relationship between the rotational speed when no load is imposed and the difference between the rotational speed when no load is imposed and the actual rotational speed. Therefore, even if the output torque of the engine varies, only the absolute values of $N_0$-Na and $N_0$change but the map pattern does not change so that there does not arise the problem of the prior art which has been explained earlier with reference to FIG. 9(b).

Preferably, the data processing unit of the invention further includes:
  (a) damage amount calculating means for weighting, for each region in the load map, the accumulated time calculated by the calculating and storing means and for calculating the actual amount of damage sustained by the engine until the certain time elapses, based on the weighted, accumulated time;
  (b) relationship setting means for presetting the relationship between the degree of damage and the life of the engine; and
  (c) life estimating means for estimating the life of the engine corresponding to the actual amount of damage calculated by the damage amount calculating means, based on the relationship set by the relationship setting means. In the data processing unit thus arranged, the accumulated time calculated by the calculating and storing means is weighted, the actual amount of damage sustained by the engine until a certain time elapses is calculated, and the life of the engine is estimated by the life estimating means based on the relationship between the degree of damage and the life of the engine. In this way, the estimated value of engine life can be represented by numerals based on the data on the aforesaid engine load condition.

In the invention, it is preferable to allow data stored in the calculating and storing means to be read out from outside. With this arrangement, data on the load condition of the engine can be taken in external personal computers or IC memories for data processing and the contents of the data can be displayed on display units so as to be visually seen.

The data processing unit of the invention may further comprise:
  (a) first transmitting and receiving means for transmitting and receiving data stored in the calculating and storing means;
  (b) second transmitting and receiving means located at a position distant from the first transmitting and receiving means, for transmitting and receiving data to and from the first transmitting and receiving means;
  (c) data processing means for processing the data received by the second transmitting and receiving means; and
  (d) displaying means for displaying the data processed by the data processing means.

In the data processing unit thus arranged, data on engine load conditions relating to a plurality of construction machines can be processed and stored in a lump at a remote place away from those construction machines. Hence, in cases where a plurality of construction machines of different types are scattered in a wide area, the aforesaid data can be collected and stored at a base station even if the operator in charge of the maintenance of the construction machines does not go to the site of each construction machine so that the operator or supervisor can obtain load data on the plurality of construction machines from the base station. In addition, a timing of overhaul or replacement of implements and parts can be estimated by obtaining an estimate of the life of the engine based on the load data which has been obtained. Accordingly, necessary service can be provided for each construction machine at an appropriate timing and therefore it is possible to prevent such an unfavorable situation that operation is interrupted because of mechanical breakdown.

The detecting means may detect the rotational speed of the engine when no load is imposed thereon by detecting the angle of rotation of a motor for driving a governor for a fuel injection pump or alternatively may detect it by detecting the actual rotational speed of the engine when an operation lever is placed in its neutral position.

BEST MODE FOR CARRYING OUT THE INVENTION

Referring now to the drawings, a data processing unit for a construction machine embodying the present invention will be described.

Figure 2:
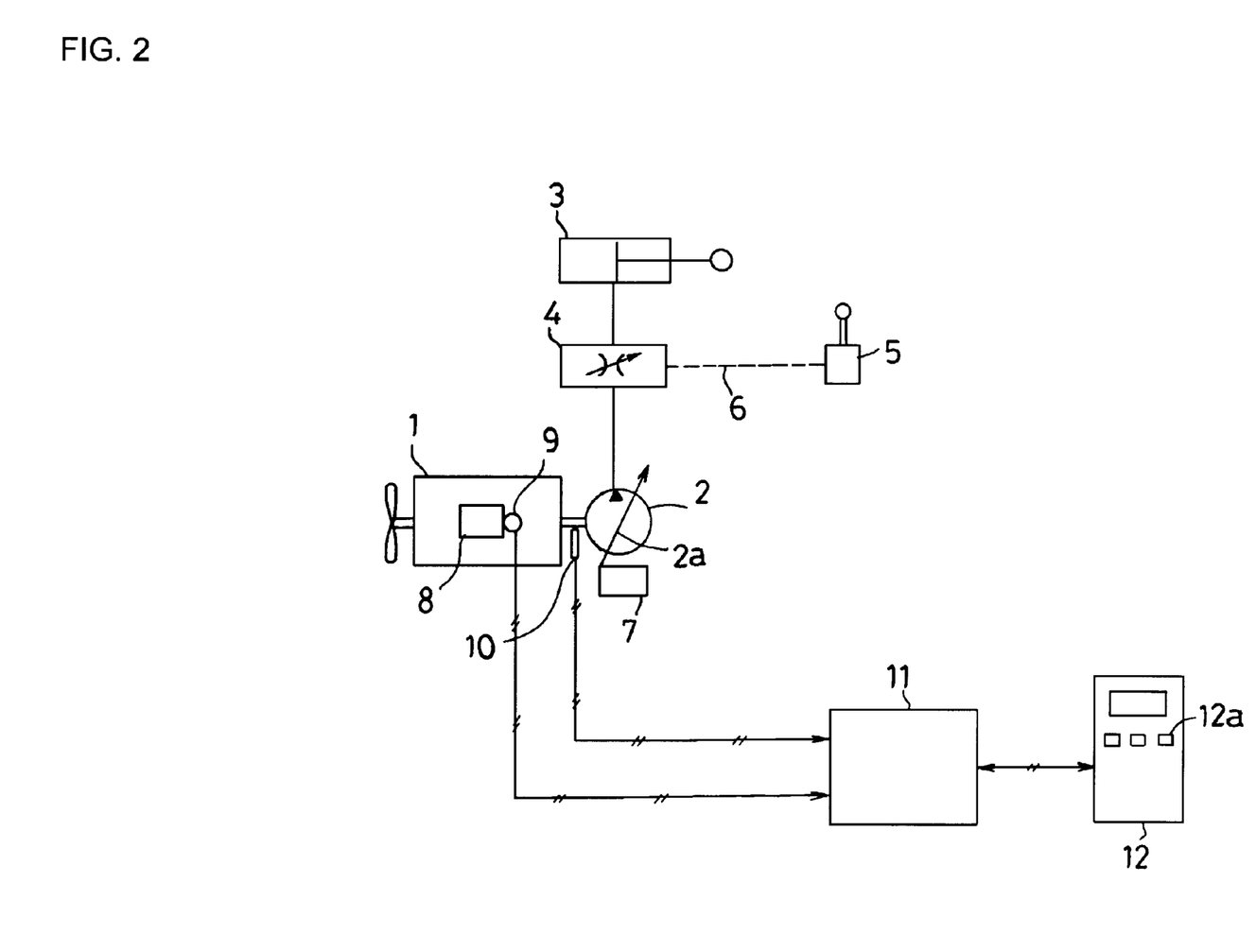
FIG. 2 is a system structure diagram of a data processing unit for a construction machine according to a first embodiment of the invention.

FIG. 2 shows a system structure diagram of a data processing unit for a construction machine according to a first embodiment of the invention when applied to a hydraulic shovel.

The hydraulic shovel of this embodiment has an engine 1; variable displacement hydraulic pumps 2 each driven by the engine 1; hydraulic cylinders 3 each driven by discharged pressure oil flowing from the hydraulic pump 2; and flow control valves 4 each located within a hydraulic circuit extending from the hydraulic pump 2 to the hydraulic cylinder 3. Each of the flow control valves 4 is arranged such that the area of opening varies according to its spool stroke position, thereby changing the flow rate of pressure oil discharged from the hydraulic pump 2 and such that this pressure oil the flow rate of which has been changed is supplied to the hydraulic cylinder 3. The flow control valve 4 is operated by pilot pressure which is supplied to the input port of the flow control valve 4 through a pilot line 6 according to the operating position of an operation lever 5. The hydraulic pump 2 is provided with a swash plate drive mechanical section 7 for varying the flow rate of pressure oil discharged from the hydraulic pump 2 by changing the position (tilt-rotation-angular position) of the swash plate 2a. Although FIG. 2 shows one of the hydraulic cylinders 3, one of the flow control valves 4 and one of the operation levers 5, the hydraulic shovel has, in fact, various implements such as a boom, arm and bucket and these implements are respectively provided with the hydraulic cylinder 3, the flow control valve 4 and the operation lever 5.

Attached to the engine 1 is a governor 8 for a fuel injection pump for supplying fuel to the engine 1. The governor 8 is provided with a governor position sensor 9 which serves as a potentiometer for detecting the driving position (control lever position) of the governor 8, that is, the angle of rotation of a motor for driving the governor 8. The output shaft of the engine 1 is provided with an engine rotational speed sensor 10 for detecting the actual rotational speed Na of the engine 1. It should be noted that the governor position sensor 9 detects the rotational speed of the engine 1 when no load is imposed on the engine 1.

Detection signals from the governor position sensor 9 and the engine rotational speed sensor 10 are input to a controller 11 as data indicative of the load condition of the engine 1. The controller 11 processes the input data to produce and store a load map (described later) and this load map and others are displayed on an external monitor 12 as required. The monitor 12 is provided with a mode switch 12a for selecting and instructing a suitable one of working modes which correspond to various operations.

Figure 3:
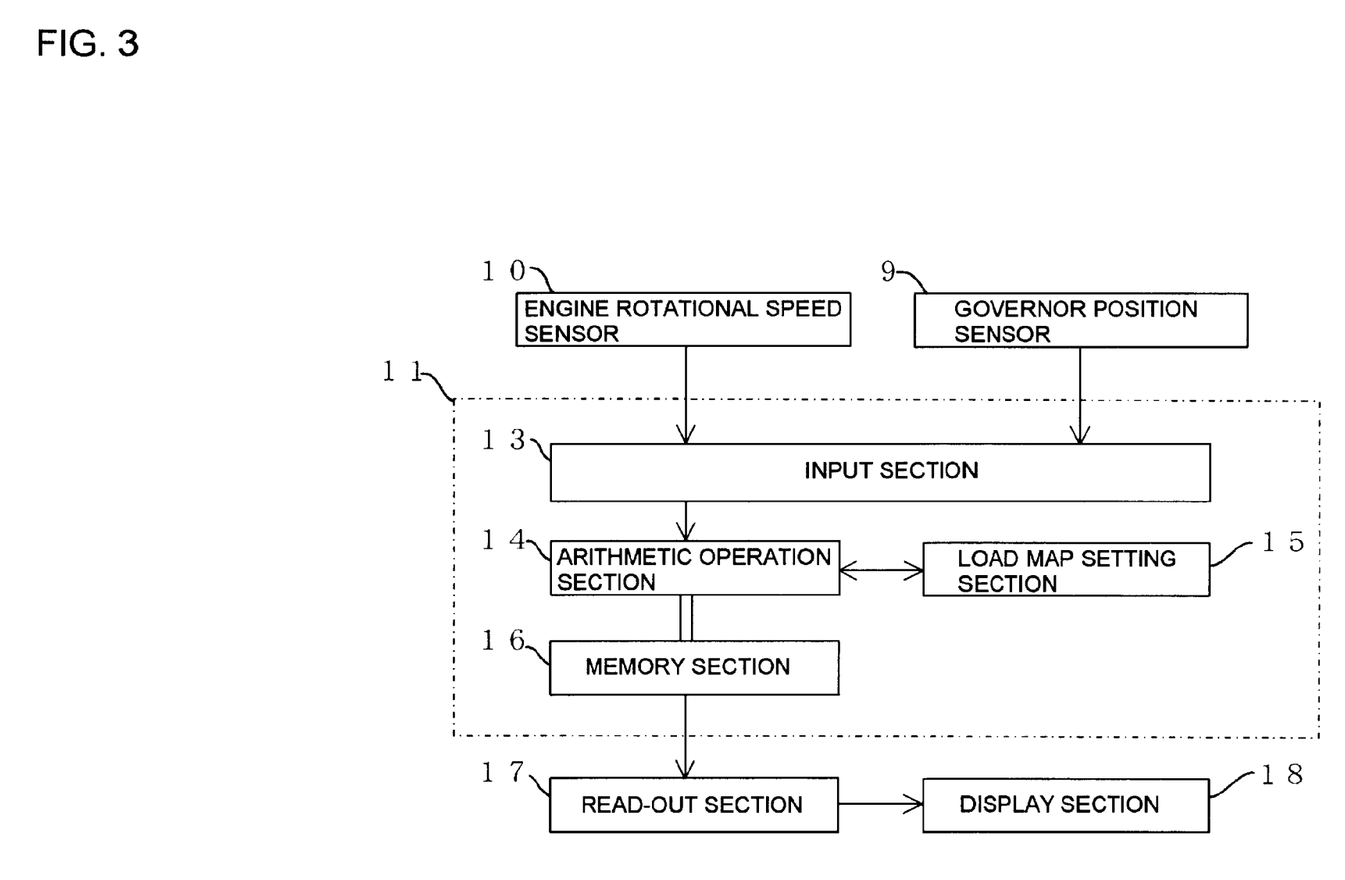
FIG. 3 is a functional block diagram according to the first embodiment.

FIG. 3 shows a functional block diagram according to the present embodiment.

The controller 11 comprises an input section 13, an arithmetic operation section 14, a load map setting section (load map setting means) 15, and a memory section 16. The input section 13 inputs a detection signal which is indicative of the actual rotational speed of the engine 1 and sent from the engine rotational speed sensor 10 and a detection signal which is indicative of the rotational speed of the engine 1 when no load is imposed thereon and sent from the governor position sensor 9. Based upon these input signals, the arithmetic operation section 14 performs necessary arithmetic operation (described later) for each region of the load map set by the load map setting section 15. The result of the arithmetic operation is stored in the memory section 16 and the contents of the stored data are displayed through a read-out section 17 on a display section 18 such as the aforesaid monitor 12. The arithmetic operation section 14 and memory section 16 of the present embodiment correspond to the calculating and storing means of the invention.

Next, the steps of the data processing executed in the controller 11 will be described in order.

Figure 4:
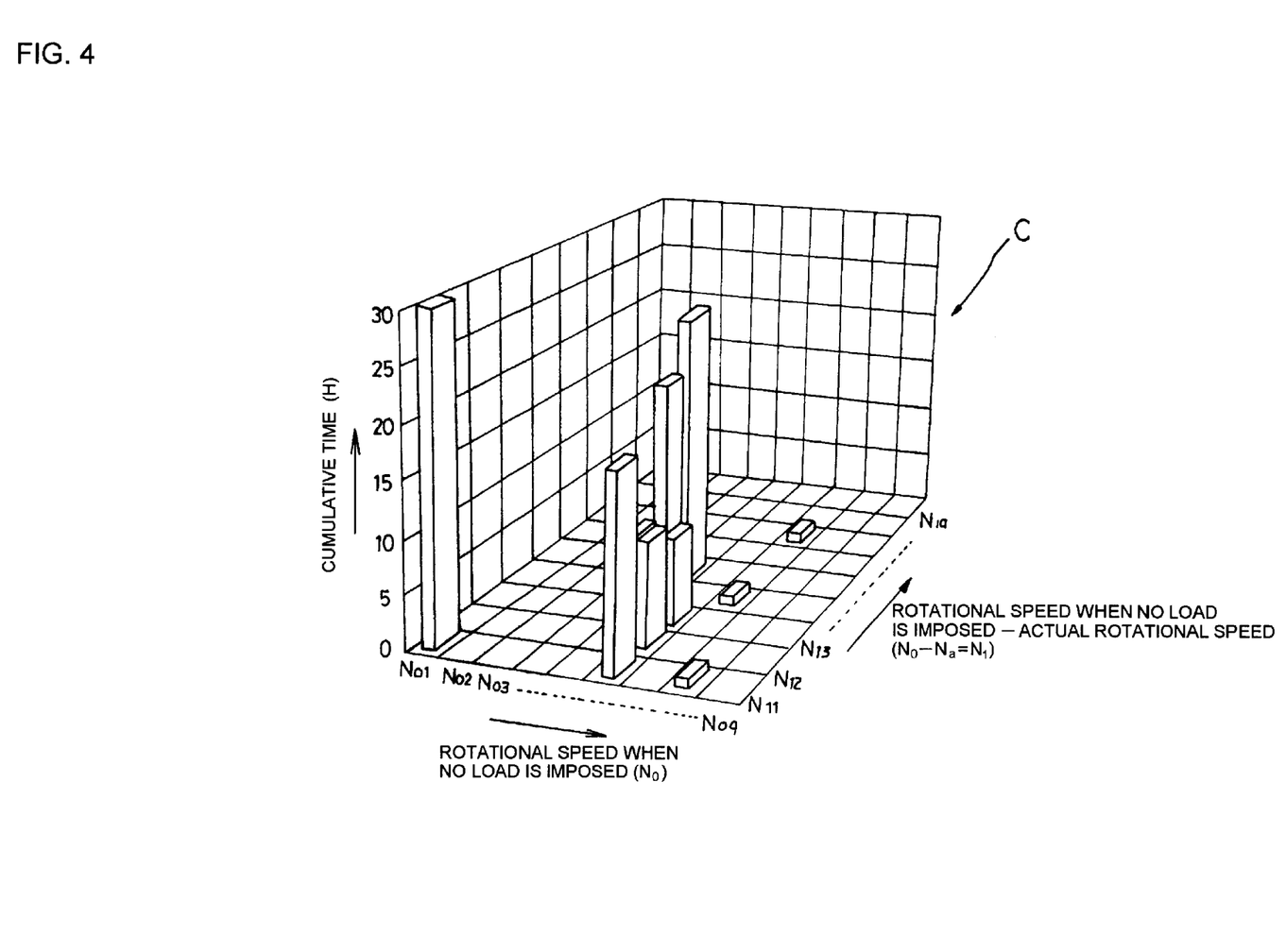
FIG. 4 is a diagram showing a load map.

First of all, the load map setting section 15 prepares a load map C, based on a detection signal indicative of the actual rotational speed of the engine 1 and on a detection signal indicative of the rotational speed of the engine 1 when no load is imposed thereon, these signals having been input in the input section 13. The values of the rotational speed when no load is imposed ($N_0$) are defined as first parameter values and the values of the difference ($N_0-Na=N_1$) between the rotational speed when no load is imposed ($N_0$) and the actual rotational speed (Na) are defined as second parameter values. In the load map C, the first parameter values are plotted as abscissa while the second parameter values are plotted as ordinate. As shown in FIG. 4, the first parameter values and the second parameter values are respectively divided into a plurality of regions in the load map C. More specifically, in the example shown in FIG. 4, the first parameter values are divided into 9 levels $N_{01}, N_{02}, N_{03}, \ldots N_{09}$, while the second parameter values are divided into 9 levels $N_{11}, N_{12}, N_{13}, \ldots N_{19}$. By combining these levels, 81 regions (9×9=81) are made. It should be noted that the number of levels into which each parameter of the load map is divided may be arbitrarily determined.

If it is determined that the engine 1 is in operation, the first parameter value ($N_0$) and the second parameter value ($N_{0-Na=N_1}$) are detected and calculated at predetermined intervals (e.g., 1s) in the arithmetic operation section 14. Then, based on the detected first and second parameter values, the number of times (i.e., detecting time) the respective parameter values belonging to each region of the load map are detected is counted for each region until a certain time elapses.

By calculating cumulative detecting time (H) for each parameter value until a certain time elapses, the load condition under which the engine 1 has been used can be recognized as a pattern as shown in FIG. 4.

The result of the arithmetic operation performed by the arithmetic operation section 14 is stored in the memory section 16, and the contents of the stored data are displayed as needed on the external display section 18 through the read-out section 17. How the engine 1 has been used can be understood at a glance by looking at the displayed data and this data can be utilized for estimating the amount of damage to the engine 1.

According to the present embodiment, the first parameter values and the second parameter values can be obtained by utilizing the engine rotational speed sensor and governor position sensor which are originally installed in a conventional unit. Since the load condition of the engine 1 can be detected and stored using these parameter values, there is no need to additionally install a rack position sensor, pump swash plate sensor or similar sensor like the conventional units in order to detect the output torque of the engine 1, so that increased cost can be avoided. Additionally, not the absolute value of engine load (output horse power) but the relationship between the rotational speed when no load is imposed ($N_0$) and the difference ($N_0-Na=N_1$) between the rotational speed when no load is imposed ($N_0$) and the actual rotational speed (Na) is stored as a load map, so that the load condition of the engine can be stored without being affected by detection accuracy and as a result, the reversal of the relationship between a detected value and an actual load can be avoided even if there are variations in the output torque of the engine.

Figure 5:
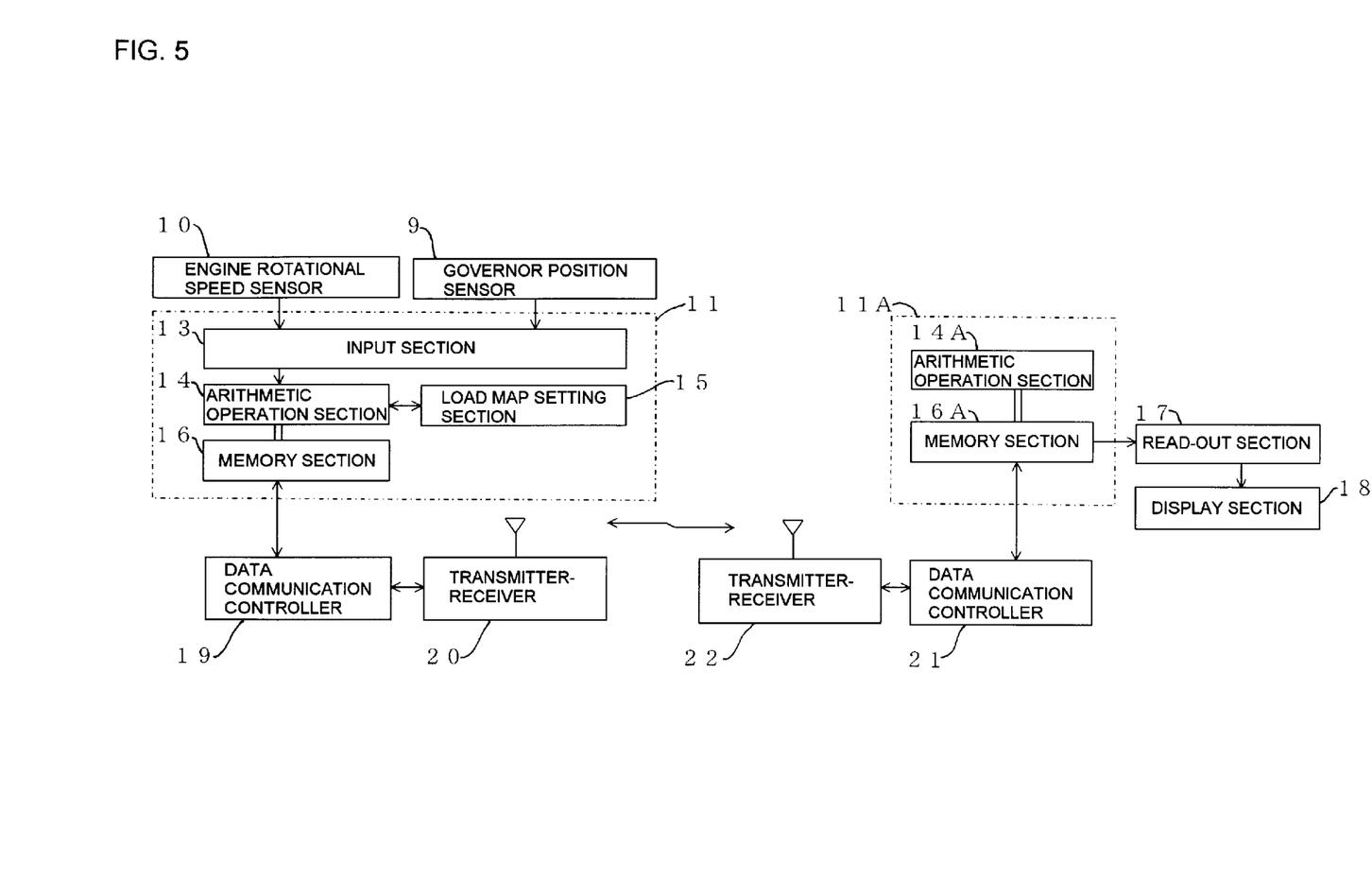
FIG. 5 is a functional block diagram according to a second embodiment of the invention.

Next, a second embodiment of the invention will be explained. FIG. 5 shows a functional block diagram relating to the second embodiment.

In the present embodiment, the structure of the controller (construction machine controller) 11 and the contents of processing executed by the controller 11 are the same as those of the first embodiment. Therefore, parts similar to those in the first embodiment are given like numerals in the accompanying drawings and those parts are not further discussed in detail while explaining only the inherent features of the second embodiment in the following description.

In the present embodiment, there are provided, on the construction machine vehicle body side, a data communication controller 19 and a construction machine side transmitter-receiver (first transmitter-receiver) 20 which are attached to the construction machine controller 11. A base station controller 11A is disposed at a location away from the construction machine. Attached to the base station controller 11A are a data communication controller 21 and a base station side transmitter-receiver (second transmitter-receiver) 22. The base station controller 11A has an arithmetic operation section (data processing means) 14A and a memory section 16A. The contents of data stored in the memory section 16A are displayed on the display section 18 such as a monitor through the read-out section 17.

In such a structure, the data associated with the load condition of the engine and stored in the memory section 16 of the construction machine controller 11 is transmitted from the construction machine side transmitter-receiver 20 to the base station side transmitter-receiver 22 through the data communication controller 19. Then, the data is taken in the memory section 16A of the base station side controller 11A through the data communication controller 21 on the base station side and processed in the arithmetic operation section 14A. In this way, the contents of the data stored in the memory section 16A of the base station side controller 11A are displayed on the display section 18 through the read-out section 17. Accordingly, how the engine 1 has been used can be understood at a glance by looking at the data displayed on the display section 18 on the base station side and this data can be utilized for estimating the amount of damage to the engine 1.

According to the present embodiment, in cases where a plurality of construction machines scattered in a wide area are in operation, the data associated with the load conditions of the engines of the respective construction machines can be processed, stored and displayed in a lump at the base station remote from those construction machines. Therefore, even if the operator or maintenance supervisor in charge of the maintenance of the construction machines does not go to the site of each construction machine, the operator or supervisor can advantageously obtain load data on the plurality of construction machines from the base station.

Although data transfer from the construction machine to the base station is carried out using a communication means in the present embodiment, this data transfer can be, of course, carried out by use of an IC card, IC memory or the like.

Next, a third embodiment of the invention will be explained. In each of the foregoing embodiments, data processing is described in which cumulative detecting time for each parameter value is calculated for each region of the load map and the calculated value is stored. Based on such a calculated value, the actual amount of damage to the engine 1 can be represented by numerals and further, the life of the engine 1 corresponding to the amount of damage can be represented by numerals for outputting.

Figure 6:
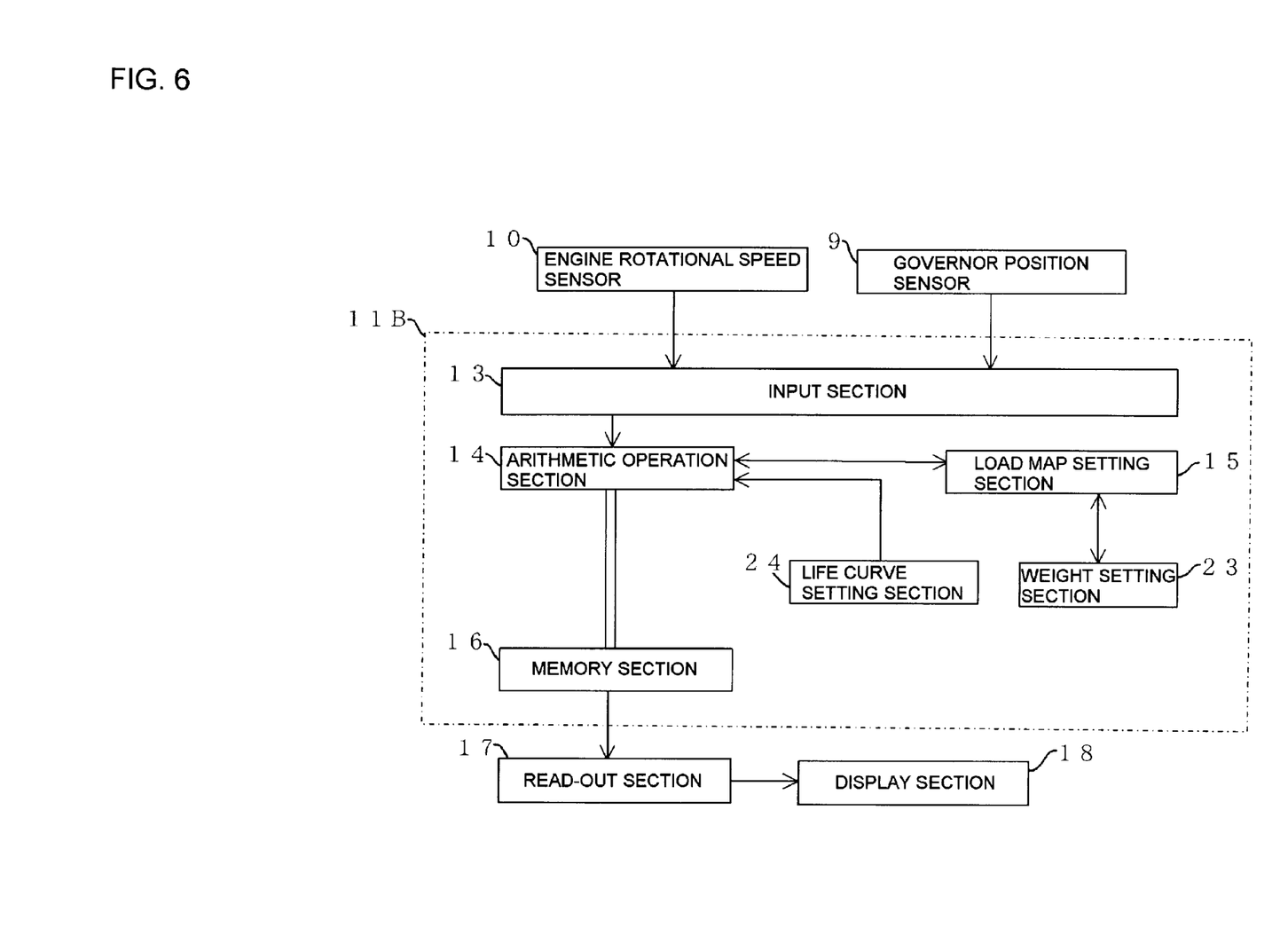
FIG. 6 is a functional block diagram according to a third embodiment of the invention.

FIG. 6 shows a functional block diagram relating to the third embodiment. In the present embodiment, a weight setting section 23 and a life curve setting section 24 are additionally incorporated into a controller 11B. Except this feature, the third embodiment is similar to the first embodiment. Therefore, parts similar to those in the first embodiment are given like numerals in the accompanying drawings and those parts are not further discussed in detail in the following description.

Figure 7:
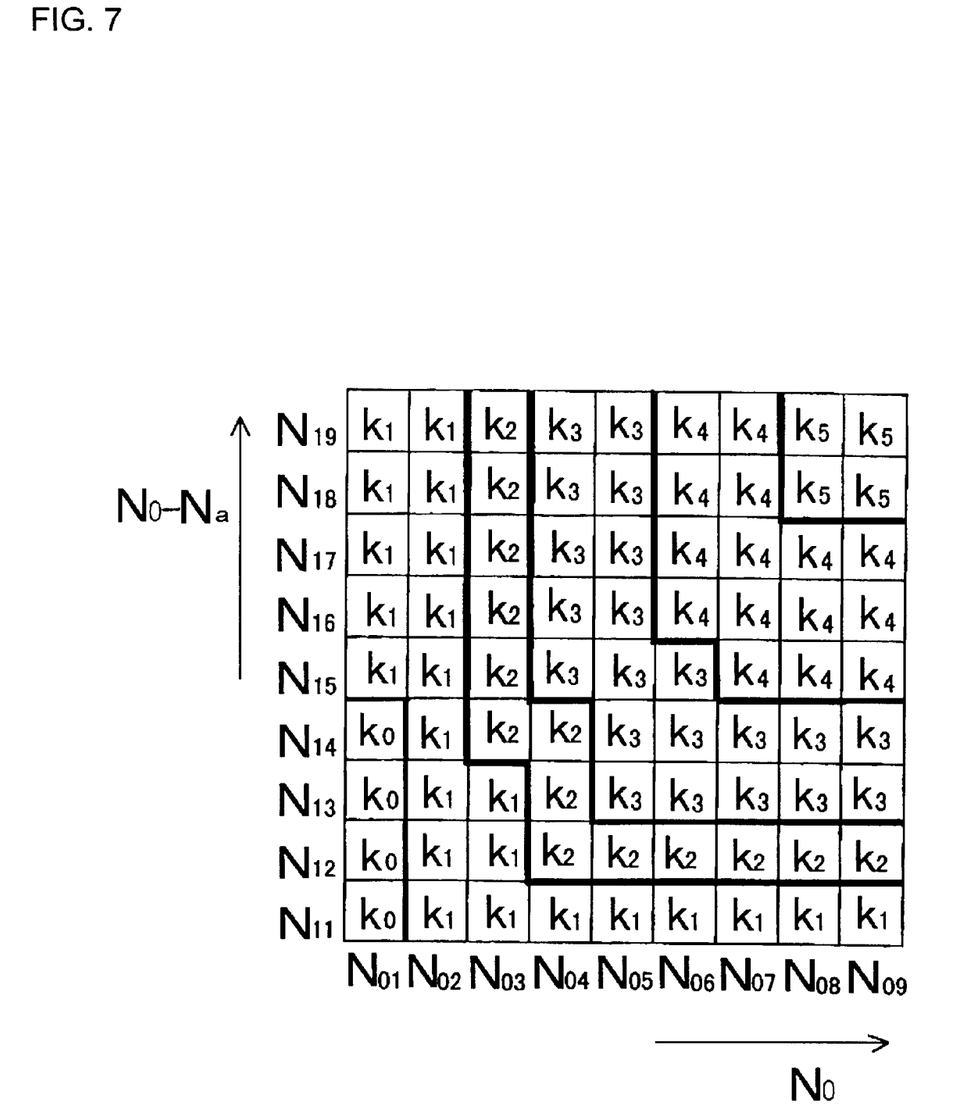
FIG. 7 shows the relationship between the load map and weights.

In the present embodiment, when the actual amount of damage sustained by the engine 1 until a certain time elapses is obtained by the arithmetic operation section (damage amount calculating means) 14 based on the cumulative detecting time of each parameter value calculated in the way explained earlier, the cumulative detecting time for every region in the load map is weighted, in the weight setting section 23. As shown in FIG. 7 (which shows the relationship between the load map and weights), a weight $k_i$ is set according to the magnitude of the load imposed on the engine 1. For example, $k_0=0$, $k_1=1$, $k_2=2$, $k_3=3$, $k_4=4$, and $k_5=5$ are adapted as the concrete value of the weight $k_i$. After the value of the weight $k_i$ is thus decided, the actual amount of damage sustained by the engine 1 (average load factor) $\delta$ is then obtained by multiplying the cumulative detecting time $H_i$ by the weight $k_i$ as described by the following equation.

$$\delta = \Sigma k_i \cdot H_i$$

When developing engines, a durability test and parts inspection after the test are conducted beforehand to preliminarily set, in a life curve setting section (relationship setting means) 24, a life curve (see FIG. 8) for every engine type, the life curve representing the relationship between the degree $\delta$ of damage and the length L of the average life of an engine.

Figure 8:
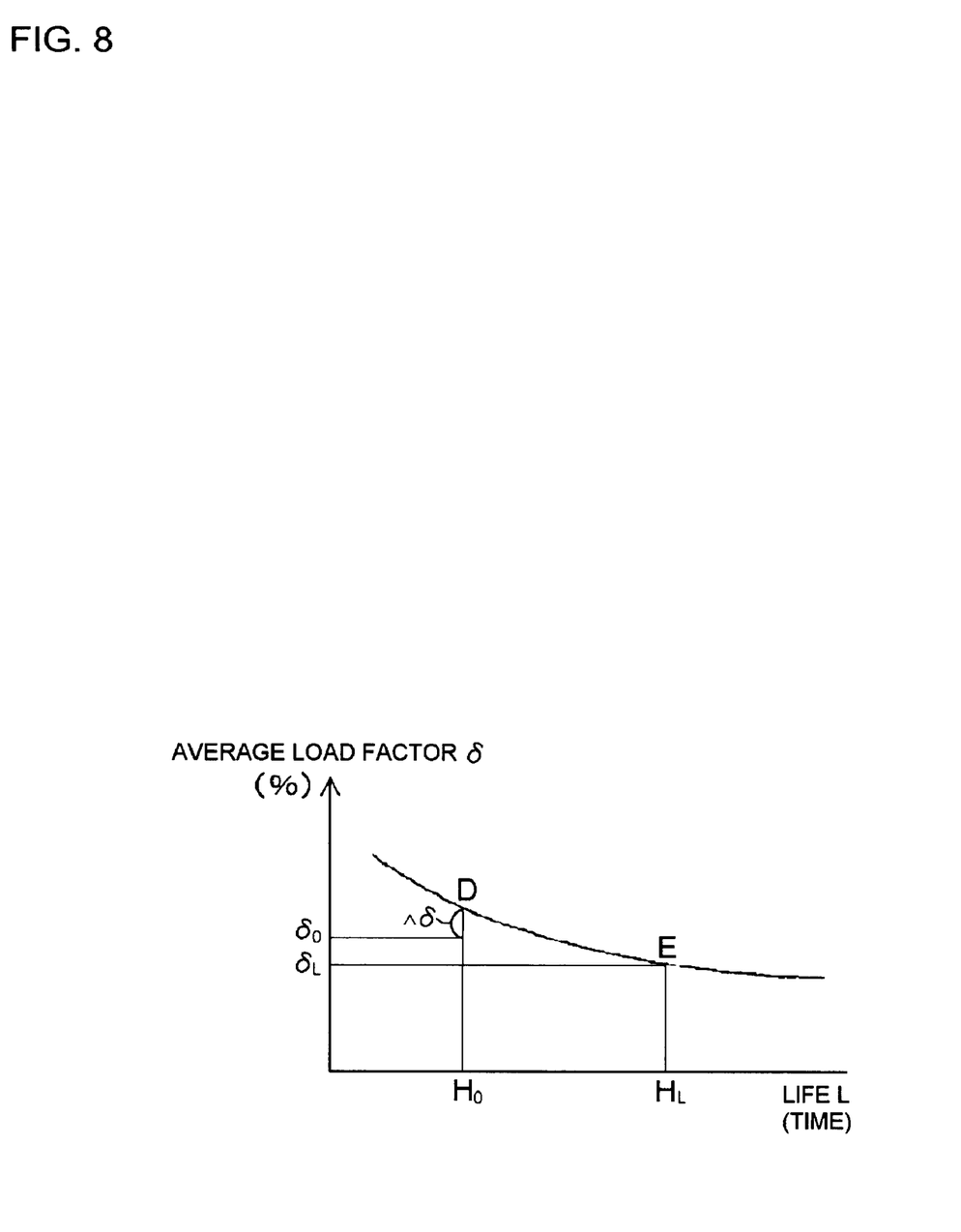
FIG. 8 shows the relationship between average load factor and service life.

Here, the life curve is set in the following way. Specifically, a load factor $\delta_0$ of 100% is assigned to a specified time $H_0$ during which a durability test was conducted. A specified margin $\Delta\delta$ is added to the load factor $\delta_0$ thereby to plot a point D. Then, a load factor $\delta_L$ under an ordinary operating condition and a life $H_L$ under an ordinary operating condition are experimentally obtained from the inspection of the wear of parts and the degree of damage to plot a point E, the inspection being conducted after the durability test. As a curve connecting the point D and the point E, the relationship (average life curve) between the degree of damage $\delta$ and the length H of the average life of the engine is thus obtained. This average life curve indicates the average life of all engines and in fact, it has a certain latitude because of variations in manufacture of individual engines. This average life curve varies depending on engine types and the kinds of parts which constitute an engine.

In the arithmetic operation section (life estimating means) 14, an estimated life L for the engine 1, which corresponds to the amount of damage $\delta$ obtained in the above described way, is calculated based on the relationship between the degree of damage and the life of the engine set by the life curve setting section 24. This calculated value is stored in the memory section 16 while being displayed on the display section 18 through the read-out section 17. An estimated value of the life of the engine is recalculated every elapse of the certain time period. With this arrangement, the result of the arithmetic operation can be corrected even when the operating condition of the engine 1 is changed.

In this embodiment, data calculated in the construction machine controller can be also taken in the base station controller through the data communication controller etc. to perform data processing.

While the rotational speed of the engine when no load is imposed thereon is detected by a governor position sensor in each of the foregoing embodiments, it may be detected from the actual rotational speed of the engine when the operation lever is in its neutral position.

While the invention has been particularly described with a hydraulic shovel in each of the foregoing embodiments, it is obvious that the invention is applicable to other types of construction machines.

What is claimed is:

1. A data processing unit for a construction machine, which collects and processes data on the load condition of an engine of the construction machine, the unit comprising:

(a) detecting means for detecting a rotational speed of the engine when no load is imposed on the engine;

(b) detecting means for detecting an actual rotational speed of the engine;

(c) load map setting means for setting a load map based on the rotational speed when no load is imposed and the actual rotational speed which have been detected by the detecting means, by dividing combinations of first parameter values and second parameter values into a plurality of regions, the first parameter values being the values of the rotational speed when no load is imposed while the second parameter values being the values of the difference between the rotational speed when no load is imposed and the actual rotational speed; and (d) calculating and storing means for accumulating the time of detecting the first parameter value and second parameter value of each region in the load map set by the load map setting means until a certain time elapses and for storing the result of the accumulation for each region in the load map.

2. The data processing unit for a construction machine according to claim 1, further comprising:

(a) damage amount calculating means for weighting, for each region in the load map, the accumulated time calculated by the calculating and storing means and for calculating the actual amount of damage sustained by the engine until the certain time elapses, based on the weighted, accumulated time;

(b) relationship setting means for presetting the relationship between the degree of damage and the life of the engine; and (c) life estimating means for estimating the life of the engine corresponding to the actual amount of damage calculated by the damage amount calculating means, based on the relationship set by the relationship setting means.

3. The data processing unit for a construction machine according to claim 1 or 2, wherein data stored in the calculating and storing means can be read out from outside.

4. The data processing unit for a construction machine according to claim 1 or 2, further comprising:

(a) first transmitting and receiving means for transmitting and receiving data stored in the calculating and storing means;

(b) second transmitting and receiving means located at a position away from the first transmitting and receiving means, for transmitting and receiving data to and from the first transmitting and receiving means;

(c) data processing means for processing the data received by the second transmitting and receiving means; and (d) displaying means for displaying the data processed by the data processing means.

5. The data processing unit for a construction machine according to claim 1, wherein said detecting means detects the rotational speed of the engine when no load is imposed on the engine by detecting the angle of rotation of a motor for driving a governor for a fuel injection pump.

6. The data processing unit for a construction machine according to claim 1, wherein said detecting means detects the rotational speed of the engine when no load is imposed on the engine by detecting the actual rotational speed of the engine when an operation lever is in its neutral position.

* * * * *